Figure 1:
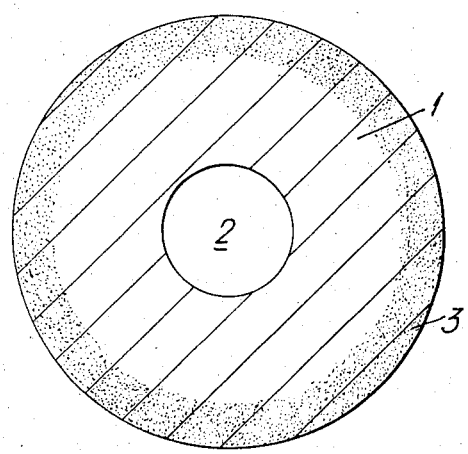

United States Patent [19]
Castro et al.

[11] 3,870,775
[45] Mar. 11, 1975

[54] METHOD OF MAKING SHAPED ARTICLES
[75] Inventors: Roger Albert Castro, East Varnet; Richard John Orman, Welwyn Garden City; James Ernest Ryan, Knebworth, all of England
[73] Assignee: Imperial Chemical Industries Limited, London, England
[22] Filed: Mar. 6, 1972
[21] Appl. No.: 231,858

[30] Foreign Application Priority Data
Mar. 10, 1971  Great Britain...................... 6460/71

[52] U.S. Cl............. 264/53, 264/311, 264/DIG. 53
[51] Int. Cl. ............................................. B29c 5/04
[58] Field of Search............: 264/310, 311, DIG. 53, 264/53

[56] References Cited
UNITED STATES PATENTS
2,944,821   7/1960   Mason ............................... 264/311
3,029,475   4/1962   Bastone ....................... 264/DIG. 53
3,290,426   12/1966  Barrentine ......................... 264/311
3,486,946   12/1969  Duddy ................................. 264/53
3,539,388   11/1970  Shu-tung Tu ........................ 264/53
3,565,982   2/1971   Day...................................... 264/53
3,619,865   11/1971  Hazzard............................. 264/311

Primary Examiner—Robert F. White
Assistant Examiner—T. E. Balhoff
Attorney, Agent, or Firm—Cushman, Darby & Cushman

[57] ABSTRACT

A shaped article having a high concentration of fibrous filler at least in selected parts, is formed by the centrifuging a flowable mixture of curable resin, diluent and fibrous filler to cause migration of the filler to concentrate it in the selected parts, and curing the resin.

8 Claims, 4 Drawing Figures

METHOD OF MAKING SHAPED ARTICLES

The invention relates to shaped articles formed by curing a resin containing fibrous fillers, and a method of making such articles using a mould which is rotated to effect migration of the filler before curing is completed.

In forming shaped articles from curable resins, it is often desirable to provide reinforcement by incorporating fibrous fillers, such as glass fibres, either in selected regions or throughout the resin. With fibrous fillers, the viscosity generally increases very rapidly as the proportion of fibre is increased, and so the composition becomes increasingly difficult to mould satisfactorily. We found that when using polyester resins we had difficulty in satisfactorily moulding compositions incorporating as little as 10 percent by weight of glass fibres because of the very high viscosity produced and because of the tendency of the fibres to agglomerate at such concentrations; and even by centrifuging flowable mixtures of resin and smaller amounts of glass fibre at speeds of the order of 500 r.p.m., the proportion of glass fibre which could be incorporated into a surface layer of any substantial thickness was still very low, or similarly only very thin surface layers could be produced with very high concentrations of filler.

According to the present invention, we provide a method of moulding a shaped article, which method includes:- placing in a mould for the article a flowable mixture containing a curable resin, a fibrous filler and an inert liquid diluent that is a non-solvent for the resin, the densities of the diluent and the filler being different; centrifuging the mixture by rotation of the mould to effect migration of the filler relative to the diluent; and curing the resin while the filler is contained within the resin.

The curable resin is an organic liquid capable of being cured to form the shaped article, and the curing may be brought about by any convenient means such as free radical catalysis, heat or other radiation, the optimum method depending generally on the resin employed. The resin may, for example, by a monomeric liquid, a solution of one or more polymers in a liquid monomer or a polymer having sites for further reaction by being only partially cured or by having cross-linkable centres which are attacked by a mechanism different from that used to produce the original polymerisation. Examples of suitable monomeric liquids are styrene and the lower alkyl methacrylates, and these may contain, for example, dissolved polymers such as polyesters, and homopolymers or copolymers of styrene, the lower alkyl methacrylates, vinyl acetate, acrylamide and acrylonitrile. The curable polymers, may, for example, be polyesters having polymerisable vinyl groups. For example, the polyester may be one of thsoe based on 2,2-bis-(4-hydroxyphenyl) propane (i.e., bisphenol A) such as the crystalline propoxylated bisphenol A fumarate polyesters containing minor amounts of maleate. In all cases, more than one resin may be used, but where these are not miscible, the rotation of the mould may cause separation of the components, which separation may be undesirable.

The diluent is preferably removed after the resin has been cured, and for use with most resins water or an aqueous solution is generally suitable.

The diluent may be used simply as a carrier for the fibrous filler where high proportions of filler are required in the resin. It is then generally preferred for the resin and a dispersion of the filler in the diluent to be separately placed in the mould, the mixture being centrifuged to transfer the filler to the resin before curing of the resin is completed. The diluent which thus acts merely as a carrier for the filler, may then be discarded. We find that we can generally obtain shaped articles by this method having far greater quantities of evenly distributed fibrous filler than could be obtained without the use of a carrier. Although the problem of high viscosities may also be overcome to some extent by adding fibrous filler by itself to the rotating mould containing the resin, it is most difficult to obtain an even distribution of filler without the use of sophisticated equipment.

Because the presence of the diluent lowers the viscosity of the mixture, as an alternative to the above sequential addition, the resin, diluent and filler may be mixed together before their addition to the mould, if desired. This is particularly the case where a cellular structure is desired. For this a flowable mixture may be emulsified to form a "water-in-oil" type of emulsion which is maintained as an emulsion while the resin cures, by the use of suitable stabilisers. In this manner the structure of the emulsion is retained, although the dispersed diluent may be subsequently removed in most cases.

By centrifuging the mixture, a variety of results may be obtained depending on the densities of the constituents relative to each other, and on whether or not a stable emulsion is obtained. Thus, for example, the emulsion may cure to a homogeneous cellular mixture of diluent and resin, with the filler migrated to form a concentrated layer at one surface; an approximately uniform solidified mixture of resin and filler may result, with the diluent separated out; or the solidified mixture of resin and filler may itself by stratified so that one surface of the article has a layer with a particularly high concentration of filler.

With a suitably adapted mould, diluent which separates from the resin before the latter cures, may be removed before curing has been completed. However it is usually more convenient to remove the diluent after the resin has been cured at least to the extent that the article may retain its shape sufficiently to allow rotation of the mould to be stopped.

Where water-in-oil emulsions are cured during the production of cellular articles, the overall volume of solidified material is substantially the same as that of the initial mixture (except for a small shrinkage which may occur during polymerisation), and hence the walls of a hollow article moulded from an emulsion will be much thicker for a given weight of resin than is obtained using a mixture of resin and diluent which separates during rotation of the mould. As the resin cures, it traps the small droplets of diluent, but these may generally be subsequently dried out to form a material having a fine cellular structure.

The water-in-oil emulsions which we have found particularly suitable for may applications have water or aqueous solutions for the disperse phase and a continuous phase of an unsaturated polyester or a solution of an unsaturated polyester in a liquid monomer, the emulsions being stablised by small quantities of additive such as ethanolamine, diethanolamine, triethanolamine or other compounds capable of increasing the degree of ionisation of the carboxylic acid group. In this respect we have found that an increase in the pH by the addition of caustic soda may effectively stabilise the emulsion with some polyesters. For maintaining stability of the emulsion, we use peroxy catalysts in preference to persulphate catalyst systems.

When using a separable mixture, the maximum proportion of diluent in the mixture appears to be limited only by the dimensions of the mould. When using emulsified mixtures however, the maximum quantity of diluent is limited by the stability of the emulsion. Emulsions containing up to 50 percent by weight of water may generally be fairly readily attained even in such simple systems as a polymer dissolved in a monomer and the mixture agitated with water. When using bisphenol A based polyesters having ether linkages, as described above, with 2 percent by weight of triethanolamine emulsifier, we have obtained stable emulsions containing up to 90 percent by weight of water, the weight percentages quoted being in respect of and with reference to the unfilled emulsions. For most applications using cellular materials, it is more economical to use emulsions which contain as much water as possible, and the quantities will depend on the components selected. The minimum quantity of diluent required, depends very much on the type and quantity of filler used. However, for mixtures containing 5 percent of glass fibres in polyester resins, we prefer to add diluent in amounts of at least 50 percent by weight of the resin, equal proportions of resin and diluent being generally more suitable.

Where cellular materials are desired, similar densities for the diluent and resin would apparently be preferable, although with stabilised emulsions of water in, for example, methacrylic esters or polyesters, we have had no discernible separation of disperse and continuous phases using moulds of about 10 cm diameter rotated at 500 rpm.

The choice of materials used for the fibrous fillers in the method of the invention is not critical, provided the initial mixture is flowable. Our preferred fillers are glass fibres, particularly chopped rovings of a high wet-out glass, e.g., a silane coated glass bonded with a polyvinyl acetate or similar polymer soluble in the resin. The quantity of fibrous material incorporated in the initial mixture will depend largely on the required distribution of filler in the shaped article and on the ease of migration. In general, we find it convenient to use less than 20 percent, preferably less than 5 percent by weight of fibrous filler based on the total weight of the mixture, since the lower quantities produce more flowable mixtures. Because the filler is effectively concentrated during rotation, very small minimum amounts e.g., 0.1 percent, of filler may generally be used. However, this severely restricts the total quantity of filler which may conveniently be incorporated, and it is generally more convenient to use at least 1 percent, where the percentages are again percentages by weight of the total mixture.

The degree of migration of the filler is dependent primarily on three factors. The first factor is the separating forces which result from the density differentials between the components, and the rate of rotation of the mould. The second factor is the resistance to migration, and this is dependent on the viscosity of the mixture and the shape of the filler particles in as much as these effect the resistance to their passage through the mixture. For example, a feathery filler may have greater difficulty in passing through the mixture than a filamental type of filler. The third factor is the time allowed for migration to take place. Thus the resin may be cured after migration has taken place, or as is generally more convenient, the curing may be initiated at the onset of rotation. In the latter case the amount of separation which takes place is clearly dependent on the gel time of the resin.

The first factor is the separating forces involved, but the most desirable ratio of densities in any one case depends on the desired final result. The density differential between diluent and resin has been mentioned above in that where a stable emulsion is desired, it is preferable that the differential be small. On the other hand, where separation of the diluent from the resin is desired, clearly the densities must be different since the differential provides the separating forces. However, we have obtained good separation in a 10 cm diameter mould at 500 rpm using a diluent whose density was as close as about 80 percent that of the resin. For most applications it is desirable that the resin takes up the shape of the mould, and hence should be of a greater density than the diluent. However, a less dense resin may be convenient, for example when casting cylindrical shapes where the filler density is low, or when using non-cylindrical moulds, so that the resin migrates inward leaving a layer of diluent between the cylindrical article and the mould.

The ratio of the density of the filler to the density of the resin will determine the direction of the migration of the filler. For most purposes, the filler may be requied predominantly at the outer surface of the article, and hence a density greater than that of the resin is generally required. However, by using a filler having a low density, an inward migration may be produced. A combination of both low and high density fillers may be particularly useful where a sandwich structure is required, e.g., of a cellular core with filled surfaces on both sides.

In order to obtain the desired degree of migration, the required density difference is dependent also on the other factors, in particular, the available rates of rotation of a given mould, the resistance to migration and the time available. For systems having a gel time of about 10 seconds with a mould of about 10 cm diameter rotated at 500 rpm, we prefer a denser material to be denser than a less dense material by at least 10 percent and particularly by at least 20 percent of the density of the latter, where relative migration is required between them.

The method of the invention is particularly suitable for use with generally cylindrical shaped moulds rotatable about their longitudinal axes. Thus for example, in a single operation, cylindrical pipes may be cast having an outer layer containing a very high proportion of fibrous filler to provide a strong outer shell, with an inner layer of unfilled resin providing a protection for the filler from corrosive fluids conveyed into the pipe. Alternatively, a mould may be radially subdivided into segments to provide a plurality of mould cavities for casting individual solid articles having a very high proportion of filler. Mould cavities so formed are particularly suitable for the production of small solid articles, even irregularly shaped articles, having a very high approximately uniform, filler content, the inert carrier serving to reduce the viscosities of the original mixture and being discarded after curing has taken place. Solid articles may also be moulded in a water-extended polymer if so desired, by filling the mould with emulsion, since no separation of the phases then occurs.

Moulds having a non-circular cross-section will tend to produce articles in which the thickness of the filled layer varies since the inner surface of the filled layer will tend to be at a constant distance from the axis of rotation. With some simple shapes, this may be at least partly overcome if desired, by the use of suitable baffles within the mould, the baffles being incorporated into the article. However, we have found that this lack of uniformity may frequently be advantageous in that for many shaped articles, it is the raised parts such as ridges and flanges which are the parts requiring the higher proportions of fillers, and it is these parts which will tend to receive the filler in preference to the corresponding troughs and other parts which are not raised. Thus for many articles, by employing our method, an expensive fibrous filler may be incorporated preferentially into those parts in which it is most required.

Figure 2:
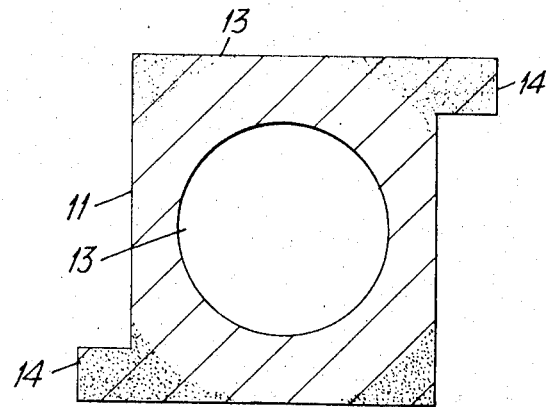
Figure 3:
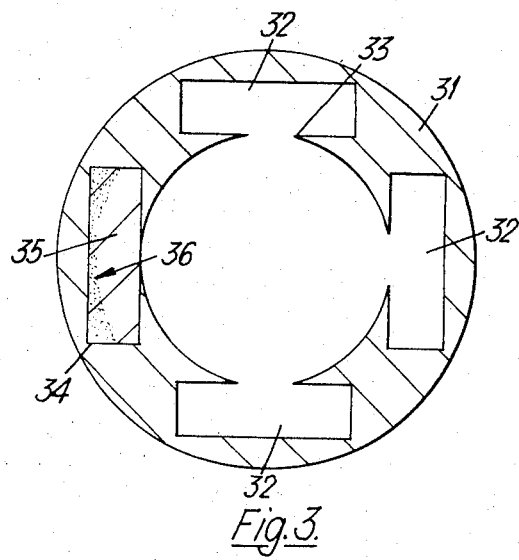
Figure 4:
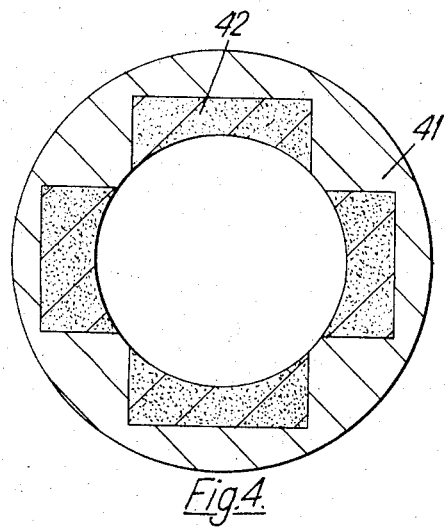

In order that the invention may be more clearly understood, the following examples are provided by way of illustration, reference being made to the accompanying drawings in which:

FIG. 1 is a cross-section through a cylindrical pipe cast from a glass-filled curable emulsion, FIG. 2 is a cross-section through a window frame member centrifugally cast from a glass filled curable emulsion, FIG. 3 is a cross-section through a hollow mould having a plurality of depressions each containing a single article, FIG. 4 is a cross-section through a hollow mould similar to that illustrated in FIG. 3, wherein the articles are substantially homogeneous.

EXAMPLE 1

A mixture was prepared in the form of an emulsion having a polyester resin continuous phase and an aqueous dispersed phase, where the resin and the water were in equal quantities by weight. The emulsion also contained 1 percent of cobalt octoate (as a 6 percent by weight solution in styrene), 0.2 percent of dimethyl aniline, 0.5 percent of water-soluble methylethylketone peroxide, and 10 percent of high strand integrity glass fibres having a length of about 0.6 cm, where the quantities are percentages by weight of resin. The resin was a commercially available solution comprising propylene glycol/fumarate/isophthalate/o-phthalate polyester dissolved in styrene, the ratio of fumarate: isophthalate:o-phthalate units being 3:5:1. The acid value was less than 5 mg KOH/g.

The mixture was made up in a beaker using a colloid type mill, the glass and the catalyst being stirred in last of all using a paddle stirrer. Approximately 1.5 litres of the mixture were then poured into a 7.6 cm diameter tube which was to serve as a mould, and which had previously been coated internally with polyvinyl alcohol release agent. The ends of the tube were then closed, and the tube together with its charge was rotated about its longitudinal axis at 500 rpm for 10 minutes, during which time the polyester cured. The end caps were then removed from the mould to reveal a tube of cellular polyester, the glass strands being evenly distributed around the outside of the pipe and along its length to a depth of about 1/7 of the wall thickness. It would appear from this fact that the glass fibre strands had all migrated to the outside of the tube to form a mat of fibres bonded together by the polyester resin.

The resultant pipe is illustrated in FIG. 1, and shows a cellular water-extended polymer core 1 surrounding a hollow interior 2, with a well differentiated outer layer 3 formed from the glass fibre bonded by the water-extended polyester resin. A sample of the glass-filled outer layer was heated in a muffle furnace and was found to contain approximately 65 percent by weight of glass. The pipe illustrated in FIG. 1 had a greater resistance to bending stresses than a similar pipe having substantially the same composition but with the glass fibres more evenly distributed by having a lower amount of migration.

EXAMPLE 2

The process of the invention was applied to the formation of a hollow window frame member, having two longitudinal ridges extending from diametrically opposite corners. These ridges are exposed to considerable stresses in use, since it is too such ridges that the infilling is attached, and this example illustrates the manner in which the present invention may be used to strengthen such ridges by the incorporation of a high proportion of glass fibres, without the expense which would be involved in filling the remainder of the material with glass fibres to the same extent.

The frame member is illustrated in FIG. 2. The member has a rectangular main portion in which the adjacent sides 11, 12 are 52 mm and 58 mm respectively. The hollow core 13 has a circular cross-section with a diameter of 34 mm, and the longitudinal ridges 14 are both 9 mm square. The length of the member is 61 cm.

The member was cast in a split wooden mould having end caps and lined with a phenol formaldehyde laminate. The inside of the mould was coated with polyvinyl alcohol release agent. The mixture employed was the same as that used in Example 1, except that the proportion of glass was only 7.5 percent by weight of the resin. After the mixture had been placed in the mould, the filled mould was rotated about its longitudinal axis at a rate of 500 rpm while the resin cured, the gel time again being about 10 minutes.

After about 15 minutes the rotation was stopped and the member was removed from the mould. The glass fibres were found to have migrated away from the axis of rotation into the four corners, and in particular into the ridges, as indicated in the drawing.

EXAMPLE 3

In both the previous examples, the present method was used to effect migration of the filler within the thickness of the walls of the article, so that the filler was predominantly in the outer surface layers. However, as we described above, the unfilled part of the cast material may sometimes by unnecessary, and the present method may then be employed merely for providing filled material which is sufficiently flowable to permit it to be cast. Accordingly, this example is provided to illustrate such techniques, using a cylindrical mould effectively similar to that used in Example 1.

The mould consisted of a rigid PVC cylinder, 10 cm in diameter and 10 cm in length, coated on its inner surface with polyvinyl alcohol release agent. The cylinder was held in a metal frame having end plates, one of which was provided with a hole closable by means of a bung, the other end plate being adapted to be held in a lathe so that the cylindrical mould could be rotated about its longitudinal axis.

The curable component comprises 111 g of "Crystic" 199 ("Crystic" 199 is a polyester resin marketed by Scott Bader and Co Ltd), 1 percent by weight of a 6 percent by weight solution of cobalt octoate in styrene, and 2 percent by weight of methylethylketone peroxide. The curable component was introduced into the mould, and the quantity specified was sufficient to give a cylindrical article having a thickness of about 3.2 mm.

The filler comprised 40 g of high strand integrity glass fibres, approximately 1.3 cm in length, and these were mixed into a diluent comprising 450 cm$^3$ of water containing 5 percent by weight of 'Methofas' PM ('Methofas' PM is a methylhydroxypropyl cellulose marketed by Imperial Chemical Industries Limited). The 'Methofas' was added to the water in order to make the water sufficiently thixotropic to prevent the glass fibre from settling out. The mixture of fibre and diluent was then added to the cylinder.

When all the ingredients had been added to the mould, the end was plugged, and the mould shaken vigorously by hand for about 30 seconds before clamping onto the lathe. The mould was rotated at 500 rpm for approximately 20 minutes, after which time the glass fibre was found to have migrated into the polyester resin which had then cured. The aqueous phase containing the cellulosic thickener remained separate from the resin, and was poured out of the moulding. When the tubular article was removed from the mould, the glass fibres appeared to be distributed substantially homogeneously within the resin matrix.

Although in the experiment described above, the curable component and the glass filled diluent were added as separate ingredients, this is not essential and in many cases it is more convenient to introduce all the ingredients together as a single mixture.

When employing the method used above where the water and resin are separable, the thickness of the tubular article is limited by the volume of diluent which must necessarily be present to provide flowability. This may be overcome, at least to some extent, by employing a mould similar to that described above, but in which the hole in the centre of the end plate is left open, thereby acting as a weir over which excess diluent may pass over. It may be utilised either by feeding a complete mixture, or by feeding the components separately. Thus, for example, all the catlysed resin may be added to the mould initially, and spun to the outer walls of the mould, the diluent containing the fibres then being added to the rotating mould before any substantial curing of the resin has occurred. The used diluent may then escape through the end hole while the fibres migrate through the polyester, further fibre-containing diluent being added as the exhausted diluent escapes.

This technique may also be employed using mixtures containing all the ingredients together, but this is generally more difficult to control than when the curable material is first added to the mould.

Where long pipes are to be moulded, it is convenient to employ a feed pipe through the centre of the mould, the mould and the feed pipe being capable of relative movement longitudinally. The mixture may then be fed to the mould continuously as the relative motion occurs. With these techniques, it is generally preferred to allow excess diluent to escape in the manner described above.

EXAMPLE 4

This example is given in order to illustrate the use of the present method in the manufacture of solid articles from a cellular material, one side of the material being preferentially filled with fibrous filler. Examples of the use of such articles is in the production of insulating tiles where one surface is provided with a high quantity of filler in order to increase the impact resistance.

The mould is illustrated in FIG. 3, and comprises in cross-section an annulus 31 having four longitudinal channels 32 opening into the centre of the annulus. The opening to each channel is bounded by lips 33. The ends of the mould, including the ends of the channels, are capped by removable end plates. The mixture used was the same as that employed in Example 1, but only sufficient mixture was added to the mould to just fill the channels when the mould was rotated. The mould was rotated for 10 minutes at 500 rpm, while curing took place. The moulded articles were withdrawn from the channels after the end plates had been removed, and consisted of elongated strips having a rectangular cross-section.

One of the cast articles has been shown in section within the mould of FIG. 3. The outer surface layer 34 of the aritcle contains a high percentage of fibre, while the inner facing surface layer 35 is formed of water-extended polymer substantially free from fibre. It will be realised, that the dividing line 36 between the filled and unfilled parts does not lie parallel with the sides but will form an arc whose centre is the centre of rotation of the mould. This curvature may of course be reduced by using a larger mould than has been employed herein for the purpose of illustrating the techniques.

EXAMPLE 5

In this example, the technique is employed in the production of solid articles formed from a cured resin containing a high proportion of glass fibre. In this case, the diluent and the resin are merely mixed together without the addition of an emulsifier, so that separation occurs during rotation in the manner illustrated in Example 3. The techniques used in this case must necessarily be slightly different from those used in the previous example, because of the different quantities of liquids used. In the previous example, all the liquid carrying the fibres was incorporated into the moulding channels, whereas in the present example part of the liquid remains in the central hole of the annulus, and hence an even distribution of the glass fibres would not be obtained using a moulding having lips like those 33 illustrated in FIG. 3.

The mould 41 employed is illustrated in FIG. 4 and has an annular cross-section as before. Machined into the inner surface are a number of longitudinal grooves 42 having open ends which are closable by the end caps in a similar manner to that described above. A mixture of resin, diluent and filler as specified in Example 3 but in which all the components were mixed together initially, was added to the mould and spun at 500 rpm for 15 minutes. After this time the mould was opened and the water together with the 'Methofas' was poured out. The moulded articles were then slid out. In this case, as in the previous cases the articles were readily removed from the mould due mainly to the slight shrinkage which occurs during polymerisation. However, where material, is employed which is more difficult to release, a split mould may be employed, but it is generally preferable to avoid the use of such moulds in order to avoid the necessity of providing a good seal between the parts.

It will be seen from the drawings, that the article is produced with one side being curved. Where this is undesirable, the article may be subsequently machined.

It is not essential that rotation takes place only about a single axis of rotation, but where more then one such axes are used, to form for example a closed hollow article, it is generally preferred for most shapes, that a fresh charge of resin or mixture be added each time the axis is changed, so as to build up the article in stages.

We claim:

1. A method of forming a shaped article having a cellular structure and a fibrous filler concentrated at one surface thereof, comprising emulsifying a substantially water-immiscible curable resin as the continuous phase with an aqueous disperse phase, adding said fibrous filler to said emulsion and stirring the mixture so formed to distribute said filler throughout the emulsion, centrifuging the mixture in a mold for the article so as to migrate said filler to one surface thereof, and curing the rsin while maintaining the dispersed state of the aqueous phase to provide the cellular structure and while continuing rotation of the mold to maintain the concentration of said filler at said one surface.

2. A method according to claim 1 in which the dispersed water is removed after the resin has been cured.

3. A method according to claim 1 in which the mixture contains dispersed water in amounts of at least 50 percent by weight of the resin.

4. A method according to claim 1 in which the filler is a chopped roving of a high wet-out glass.

5. A method according to claim 1 in which the fibrous filler is present in amounts of from 0.1 to 20 percent by weight of the total weight of the mixture.

6. A method according to claim 1 in which a denser material is denser than a less dense material by at least 10 percent of the density of the latter, where relative migration is required between them.

7. A method according to claim 1 in which the mould is subdivided radially into segments to provide a plurality of mold cavities for casting individual solid articles.

8. A shaped article when made by a method as claimed in claim 1.

* * * * *